L. BRAUER.
Car Axle Box.
No. 95,867.          Patented Oct. 12, 1869.
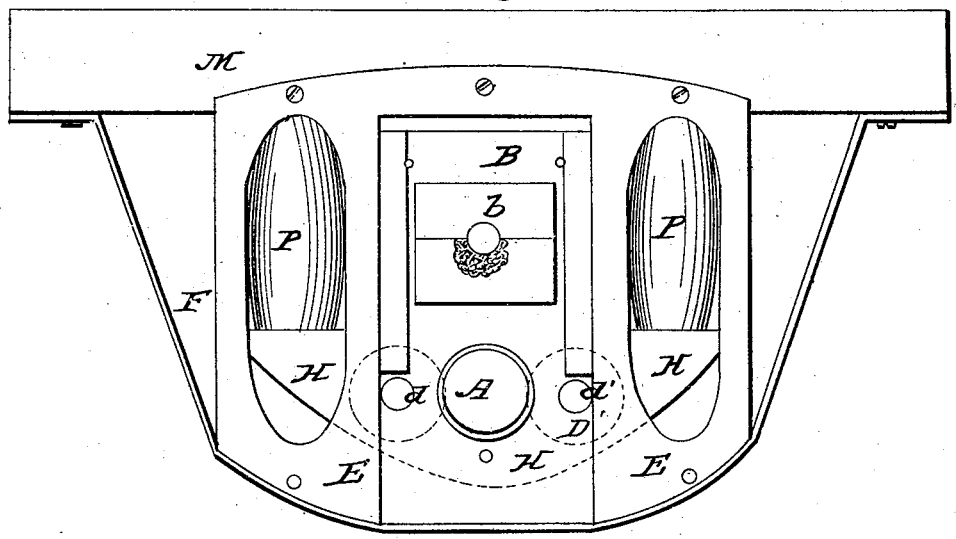
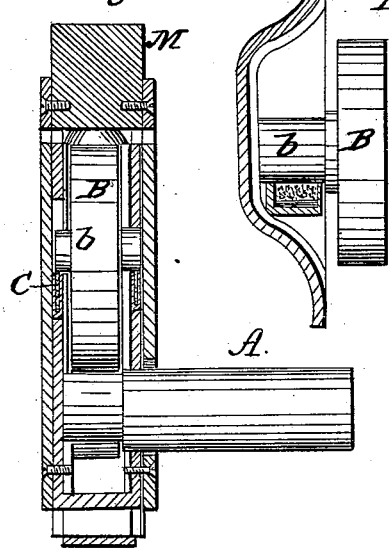
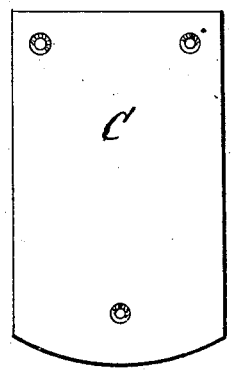
WITNESSES
INVENTOR

United States Patent Office.

LOUIS BRAUER, OF WASHINGTON, DISTRICT OF COLUMBIA.

Letters Patent No. 95,867, dated October 12, 1869.

IMPROVED CAR-AXLE BEARING.

The Schedule referred to in these Letters Patent and making part of the same.

*To all whom it may concern:*

Be it known that I, LOUIS BRAUER, of Washington, in the District of Columbia, have made a new and useful Improvement in Car-Axle Boxes, whereby the friction on the journals and bearings is much diminished, and the repair of the different parts of the axle-box and the journals, when worn out or injured, is rendered easier.

The following description, in connection with the annexed sheet of drawings, will enable others to make and use my invention.

Figure 1 shows a side elevation of my improved car-axle box, as applied to an ordinary street-railroad car;

Figure 2 is a vertical cross-section through the line of the centre of the car-axle and the centre of the axis of the principal friction-roll or wheel;

Figure 3 represents the front plate, which covers the box so as to keep out dust; and Figure 4 shows a device for giving a larger contact-surface to the bearings and journals of the friction-wheels.

The use of anti-friction rolls and wheels in car-axle boxes has been long known, but, with a few exceptions, they have not proved practicable.

Two modes of applying such rolls or wheels have been adopted.

The one is similar to the ordinary friction-rolls used in mounting grindstones; that is to say, the journal of the car-axle runs between and on the peripheries of two friction-wheels.

The other plan is to place a number of small rolls around the car-axle journal, so as to roll on its surface, and revolve around it and in contact with it, somewhat after the manner of satellites about a primary planet.

I arrange my anti-friction-wheels entirely differently.

I use three wheels, each having its own bearings and journals.

One of these is placed so as to receive, on its surface, the entire weight supported by the end of the car-axle to which it is attached. This, for convenience, I call the "centre-wheel."

The other two wheels serve only to keep the car-axle journal vertically under the other wheels. These I call "side-wheels."

By this arrangement the journal of the car-axle is not wedged in between two wheels, as in the kind of anti-friction-rolls first above mentioned, and the disadvantages of a series of small rolls, as in the second plan above mentioned, are avoided.

In the drawing—

A is the journal of the car-axle.

B is the "centre-wheel," and *b*, its axle.

D D' are the "side-wheels," and *d d'*, their axles.

The bearings of the "centre-wheel" B and side-wheels D D' are placed in a single box or frame.

As nearly the whole friction to be encountered is transferred to the journals of the "centre-wheel," it should be provided with a suitable journal-box, with oil-cup, packing, and bearings of proper metal, as shown in fig. 4.

The construction of such journal-boxes being well understood, need not be particularly described.

The oil-cups for the two journals of the centre-wheel B may be connected by a tube or channel, passing from one to the other, so as to supply oil to both journals at the same time. The usual fibrous pad or packing may be used in these oil-cups.

There will also be some friction on the journals of the side-wheels, but much less than on those of the "centre-wheels." They should also have proper journal-boxes, so as to be lubricated in the ordinary manner.

The oil-cups of both side-wheels may be connected by channels, so as to supply oil to all the bearings of these wheels at the same time.

The wheels B, D, and D' may be made of steel, iron, or any other suitable material possessing the requisite strength.

I prefer to make the axles of these wheels of spring-steel, and separate from the wheels themselves, so that when worn out, they may be removed and new ones put in.

The wheels need not be made solid, but the periphery or tire should be both hard and tough.

The centre-wheel B should be made two, three, or more times the diameter of the journal of the car-axle.

The side-wheels D D' need not be so large, as their object is only to keep the journal A directly under the wheel B.

It is obvious that so long as the size of the wheel B is not greater than the disposable space for its reception, the larger it is, the less the friction.

The stationary cast-iron frame E is secured to the bottom of the car-body M by the strap F and the ordinary bolts and screws.

Within the frame E is the vibrating hollow box H, composed of two substantial plates, connected firmly together, in the walls of which are fixed the bearings and journal-boxes of the wheels B, D, D', and in the hollow portion of this vibrating box these wheels revolve, so as to permit the car-axle to revolve against them, free from all friction.

The springs P P are placed in the usual manner.

I have described my invention as applied to an ordinary street-car, but it may be applied to the truck-frames of the common railway-cars and locomotives.

My system of anti-friction-wheels may be easily applied to all rapidly-revolving journals which carry great weight, and in which there is difficulty from heating. The only change in this case is to place the centre-wheel B directly under the journal of which the friction is to be relieved, instead of over it, as in cars.

In stationary engines and mills, the size of the centre-wheel B may be enlarged to any extent desirable, and thus that part of the friction which comes from high speed be entirely destroyed or obviated.

Having described my invention,

What I claim, and desire to secure by Letters Patent of the United States, is—

1. The hollow vibrating box or case, provided with the side-rollers D D' and large roller B, and with the shoulders H H and springs P P resting thereon, all constructed and arranged to operate as and for the purpose set forth.

2. In combination with the box carrying the described arrangement of wheels and springs, the stationary frame E, constructed and applied to the car, substantially as and for the purpose set forth.

LOUIS BRAUER.

Witnesses:
  J. D. PATTEN,
  D. P. COWL.